May 12, 1959 T. BARISH ET AL 2,886,112
ROTATABLE SEAL FOR COWLINGS
Filed Jan. 11, 1955 5 Sheets-Sheet 5

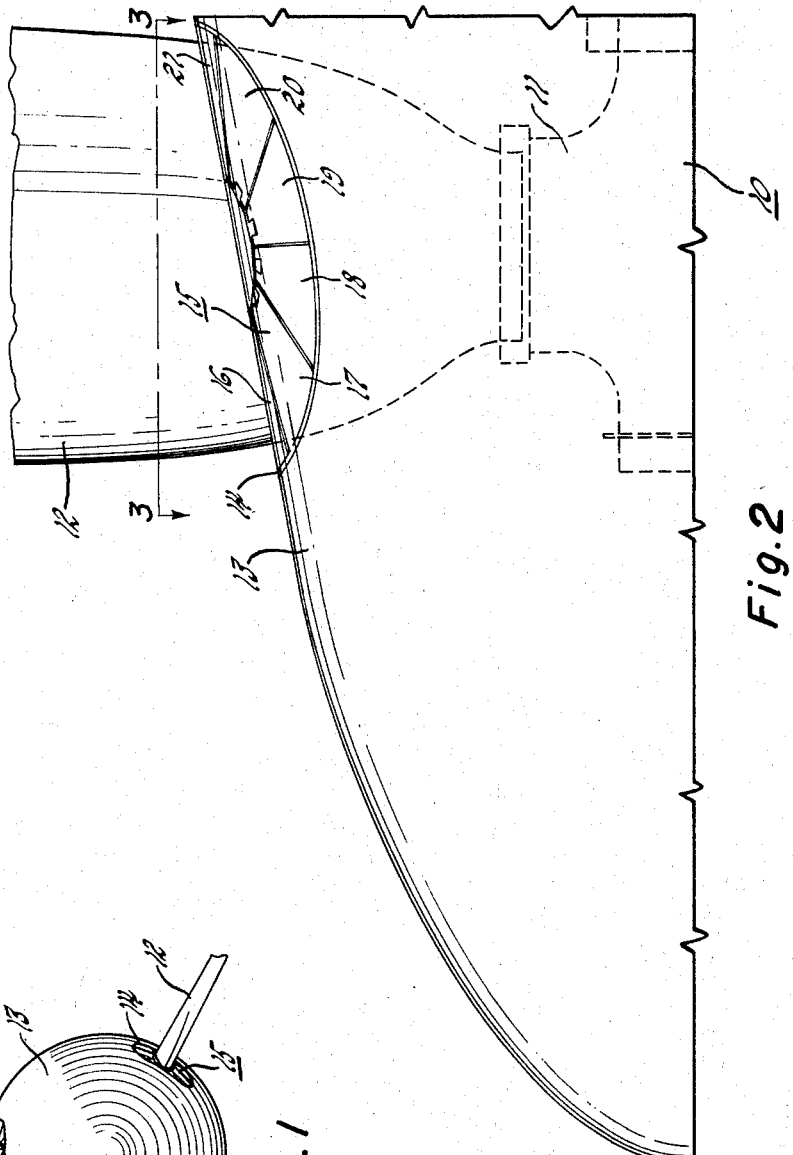

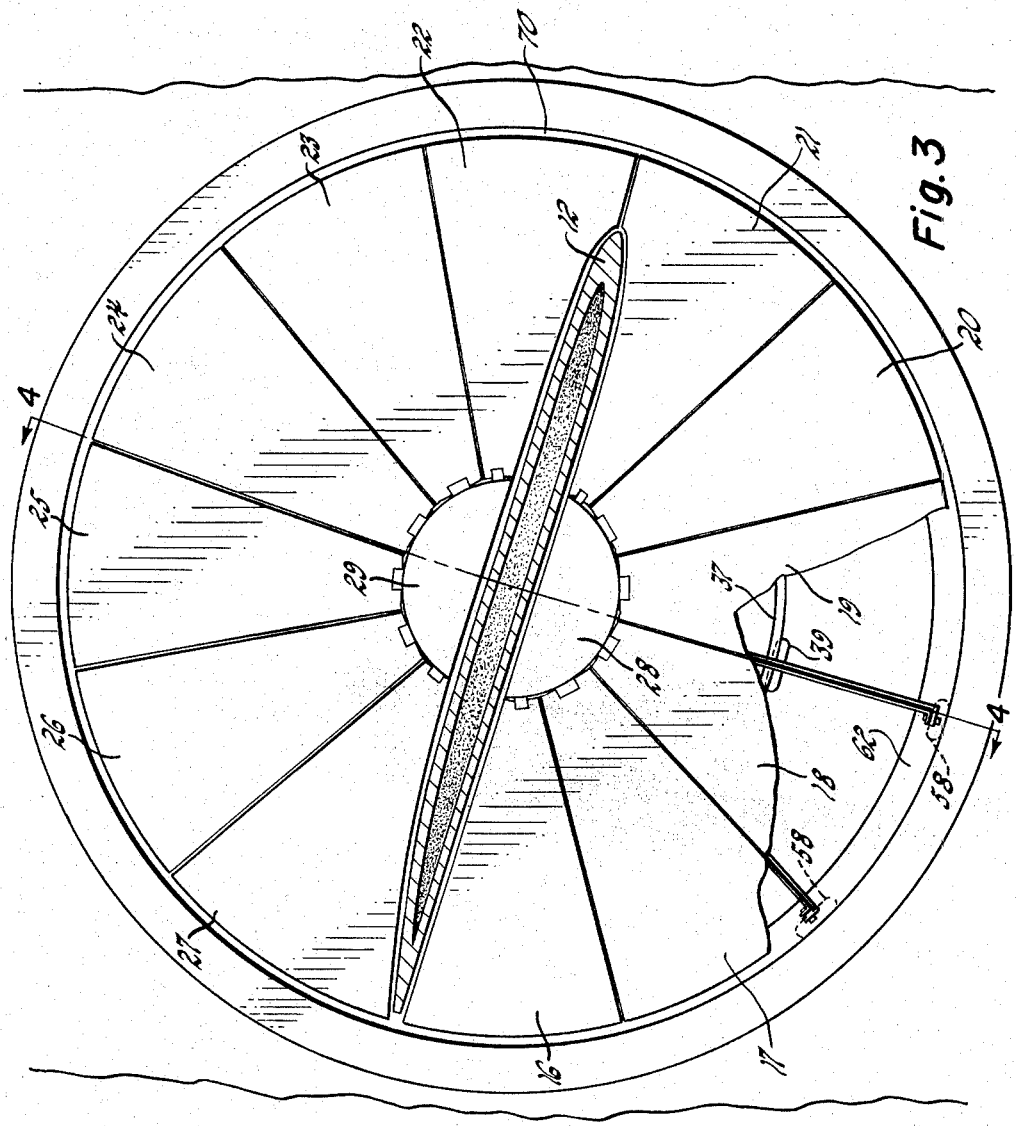

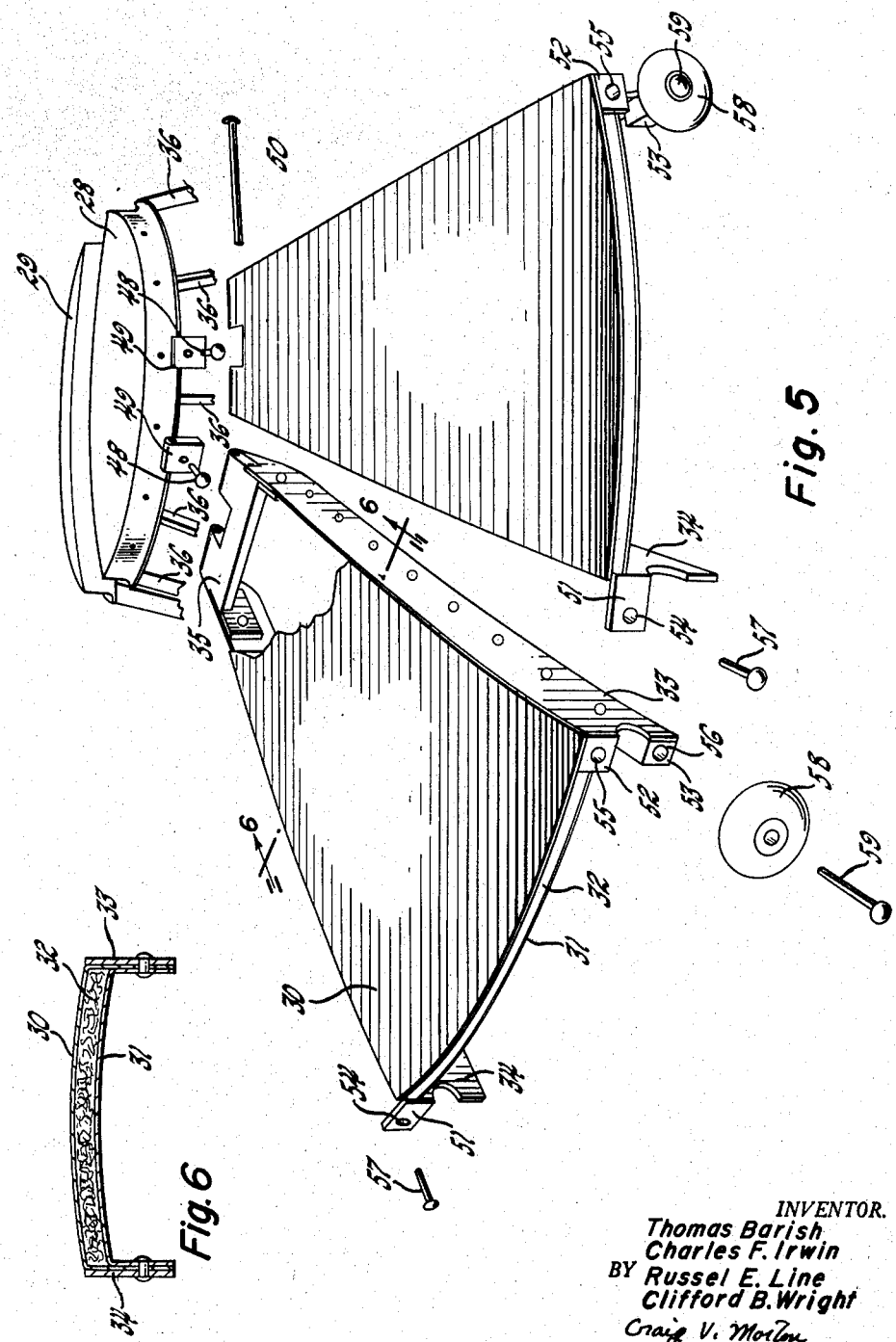

INVENTOR.
Thomas Barish
Charles F. Irwin
BY Russel E. Line
Clifford B. Wright
Craig V. Morton
Their Attorney

United States Patent Office 2,886,112
Patented May 12, 1959

2,886,112

ROTATABLE SEAL FOR COWLINGS

Thomas Barish, Cleveland, Charles F. Irwin, Tipp City, Russel E. Line, Dayton, and Clifford B. Wright, Tipp City, Ohio, assignors to General Motors Corporation, Detroit, Mich., a corporation of Delaware Application January 11, 1955, Serial No. 481,236

9 Claims. (Cl. 170—160.23)

This invention pertains to rotatable seals, or closure members, for curved cowling surfaces, and particularly to a rotatable seal for the blade cutout openings of a propeller spinner.

Heretofore, it has been proposed to use warpable, or flexible closure members for sealing the cutout openings in propeller spinners through which propeller blades extend. Prior art flexible closures were generally composed of rubber. However, with the advent of supersonic aircraft, prior flexible closures have been rendered obsolete due to their inability to withstand the centrifugal forces to which they are subjected at high speeds. This invention comprehends the provision of a seal assembly which conforms substantially to the spinner profile at all angular positions of the propeller blade, and, yet, has sufficient strength to withstand high speed centrifugal loading. Accordingly, among our objects are the provision of a spinner seal rotatable with a propeller blade for substantially maintaining the spinner profile irrespective of the angular position of the blade; the further provision of a rotatable seal comprising a plurality of interconnected members which are movable along different axes during relative rotation between the seal and the spinner; and the still further provision of a spinner seal which will not be subject to distortion due to centrifugal loading.

The aforementioned and other objects are accomplished in the present invention by provision of a seal assembly comprising a plurality of pivotally interconnected, rigid members. Specifically, the seal assembly is designed to close a spinner opening through which a propeller blade extends. Thus, the seal assembly comprises a plurality of segmental members of equal length having compound curvature. Each segmental member is of sandwich construction and, thus, includes a pair of spaced metal sheets with a layer of cellular material disposed therebetween and bonded thereto. The inner ends of the segmental members constituting half of the rotatable seal are pivotally connected to a semi-circular metal hub section.

The hub of the seal assembly comprises a pair of semi-circular hub sections having inwardly extending and outwardly diverging webs which terminate in arcuate sections of an inner ring. The two semi-circular hub sections are maintained in spaced relation to form an opening through which the airfoil portion of a propeller blade extends. The inner ring, or drum, is completed within the profile of the spinner by a pair of diametrically opposed U-shaped bracket members which are bolted to the juxtaposed end webs of each hub section. Each arcuate ring section carries a plurality of rollers which are guided for movement in a circular track of simple curvature that is formed in the bulkhead support for the spinner. In addition, each of the U-shaped bracket members carries a roller that is also guided for movement within this circular track. During rotation of the blade about its longitudinal axis the hub will rotate due to engagement of driving arms with the camber and thrust surfaces of the airfoil portion of the blade.

Each half of the seal assembly comprises six segmental sandwich members having their inner ends pivotally connected to one of the semi-circular hub sections. The juxtaposed end segmental members of each half, together with the two hub sections define an opening of airfoil cross-section through which the blade extends. The outer edge of each segmental member is pivotally connected to the adjacent segmental member. In addition, each segmental member supports a roller which is guided for movement in a track attached to the spinner adjacent the cutout opening. This track comprises an inverted L-shaped member having compound curvature, i.e., the track conforms to both the cutout opening and the profile of the spinner. A clearance gap of substantially constant radial extent is maintained between the outer edges of the segments and the peripheral edge of the spinner cutout opening. Accordingly, during rotation of the seal assembly with the propeller blade, the segmental members will pivot about their interconnection with the hub and also pivot relative to each other so as to maintain a substantially smooth spinner profile irrespective of the angular position of the propeller blade.

Further objects and advantages of the present invention will be apparent from the following description, reference being had to the accompanying drawings wherein a preferred embodiment of the present invention is clearly shown.

In the drawings:

Fig. 1 is a front view, in elevation, of a propeller including the seal assembly of this invention.

Fig. 2 is an enlarged fragmentary side view, in elevation, of a propeller constructed according to this invention.

Fig. 3 is an enlarged fragmentary view, partly in section and partly in elevation, taken along line 3—3 of Fig. 2.

Fig. 5 is an exploded view illustrating the manner in which the segmental members are pivotally connected with the hub and the manner in which rollers are attached to the segmental members.

Fig. 6 is a sectional view taken along line 6—6 of Fig. 5.

Figure 4:
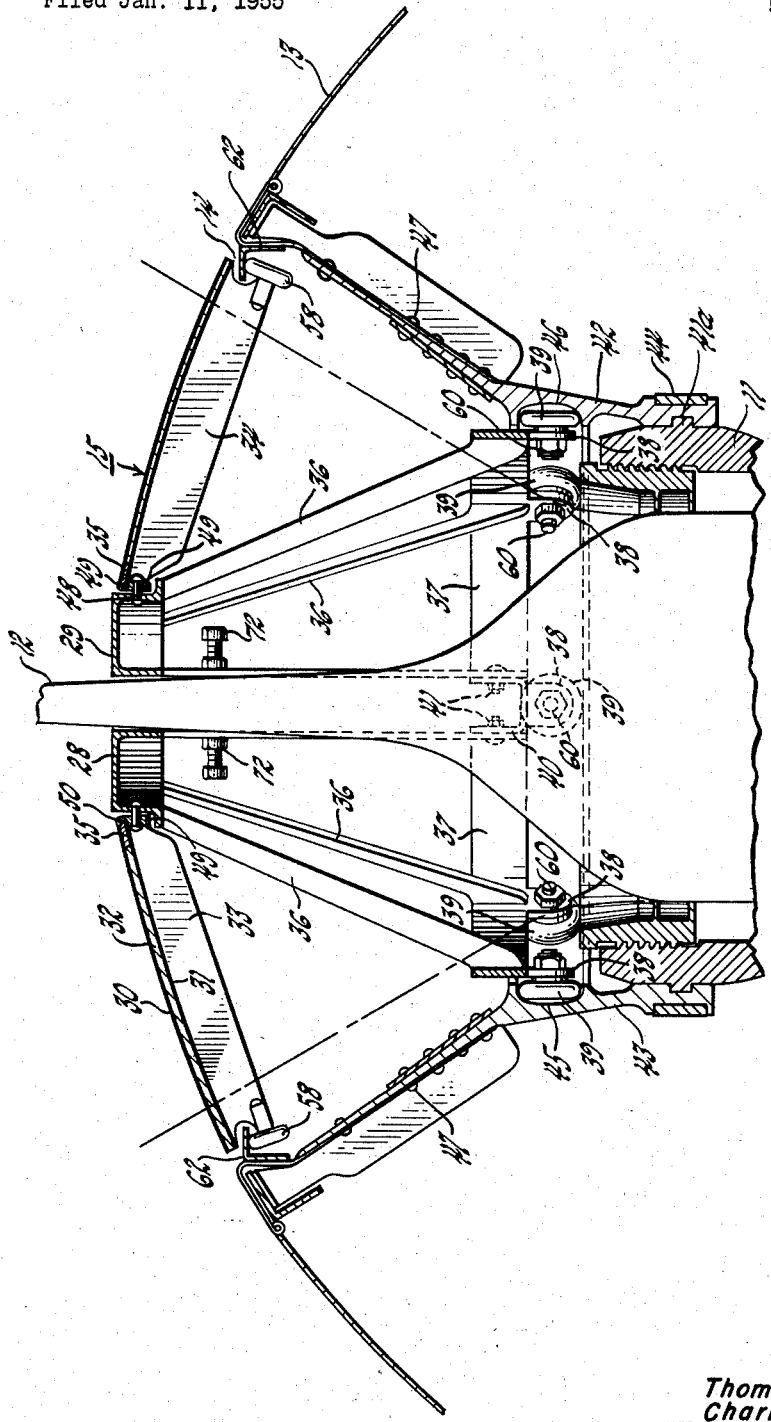
Fig. 4 is a fragmentary sectional view taken along line 4—4 of Fig. 3.

With particular reference to Figs. 1 and 2, the rotatable seal assembly of this invention is adapted for use in conjunction with an aircraft propeller assembly comprising a hub 10 having a plurality of circumferentially spaced, radially extending sockets 11 within which propeller blades 12 are supported for rotation about their longitudinal axes. The hub 10 of the propeller assembly is enclosed by a rotatable spinner shell 13 of airfoil configuration, the shell 13 having a plurality of cutout openings 14 through which the blades extend, the cutout openings being closed by the seal assembly of this invention, as generally depicted by numeral 15. The spinner shell 13 is suitably connected to the propeller hub 10, as will be pointed out more particularly hereinafter, whereby the spinner shell rotates with the propeller.

With reference to Figs. 2 and 3, it may be seen that the seal assembly 15 comprises a plurality of segmental members 16, 17, 18, 19, 20, 21, 22, 23, 24, 25, 26 and 27. The segmental members 16 through 27 are of equal length, and a clearance gap 70 of substantially constant radial extent is maintained between the outer edges of the segments and the peripheral edge of the spinner cutout opening. The segmental members 16 through 21, together with a semi-circular hub section 28 constitute one-half of the rotatable seal assembly, while the segmental sections 23 through 27 and semi-circular hub section 29 constitute the other half of the rotatable seal assembly.

Each of the segmental members 16 through 27 is of similar construction, and, hence, a description of one is deemed to suffice. As may be seen in Figs. 5 and 6, each segmental section comprises a pair of spaced metal sheets 30, 31 having disposed therebetween and bonded thereto a layer of cellular cellulose acetate 32. Thus, each segmental member is of sandwich construction and, hence, is rigid. That is, the segment, per se, is neither flexible nor subject to distortion due to centrifugal loading. The sides of each segment are constituted by metal plates 33 and 34, the inner ends of which are riveted to a hinge member 35. The side edges of the sheets 30 and 31 are bent inwardly, as depicted in Fig. 6, and are riveted to plates 33 and 34. It should also be noted that each segment is of compound curvature, that is, the profile of each segment is curved in two directions, namely about the horizontal axis of the propeller and along the parabolic profile of the spinner. Furthermore, the upper and lower sheets 30 and 31 of the sandwich structure are rigidly connected to the upper and lower surfaces of the hinge member 35, as depicted in Fig. 4.

Figure 7:
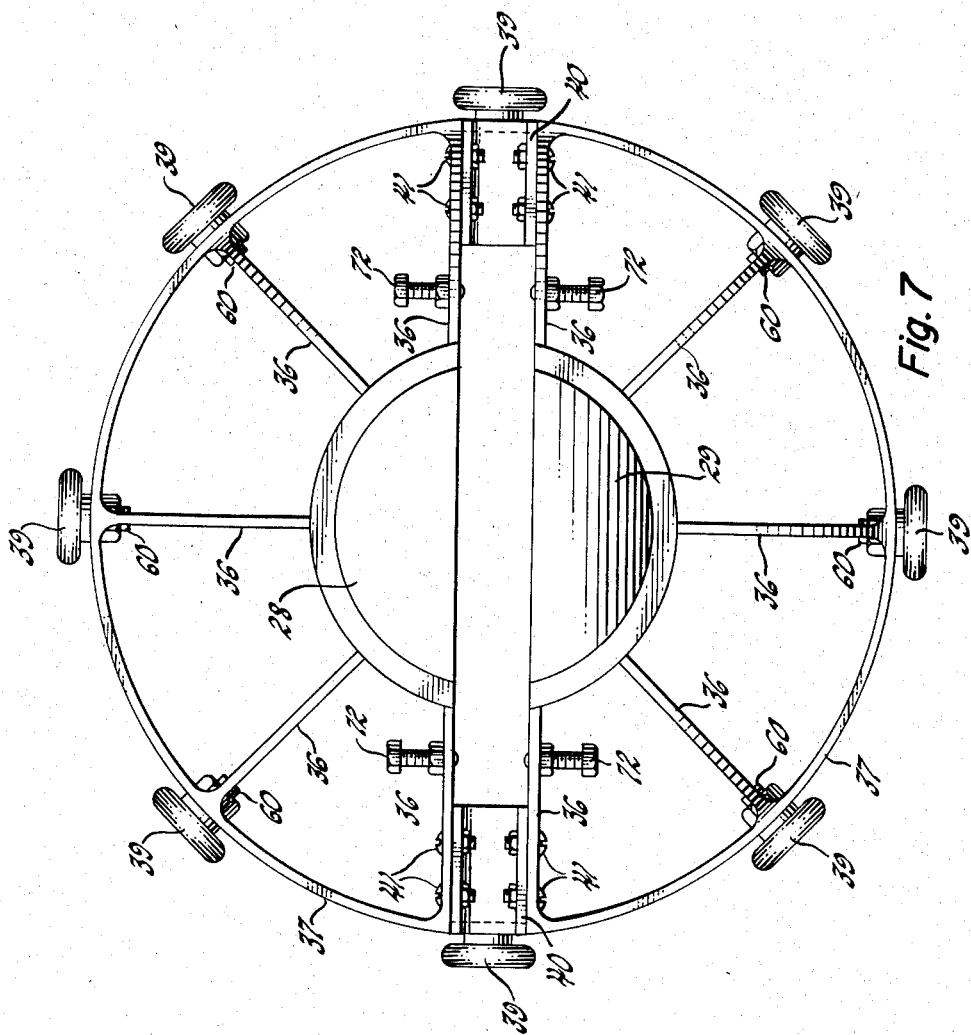
Fig. 7 is a plan view, in elevation, of the hub assembly, with certain parts removed.

With reference to Figs. 3, 4 and 7, the construction of the hub for the seal assembly will be described. The hub comprises a pair of semi-circular sections 28 and 29 of channeled cross-section. The hub sections 28 and 29 are maintained in spaced relationship with respect to opposite surfaces of blade 12. Each hub section is formed with five inwardly extending, outwardly diverging webs 36, which terminate in a semi-circular ring portion 37. Each ring section 37 is formed with three longitudinally extending, apertured portions 38 in substantial alignment with the intermediate webs. Each portion 38 supports a roller 39 carried by a bolt 60 as depicted in Figs. 4 and 7. The juxtaposed ends of the semi-circular members 37 are interconnected by U-shaped members 40, which are connected to the juxtaposed end webs of the two hub sections 28 and 29 by means of bolts 41. In addition, each U-shaped member 40, likewise, supports a roller 39. Thus, the two hub sections 28 and 29 are interconnected by the ring sections 37 and U-shaped members 40 to form an integral subassembly. The juxtaposed end webs of the two hub sections 28 and 29 carry driving arms, or bolts, 72 which may be adjusted to engage opposite surfaces of the blade 12 and thus drivingly connect the seal assembly hub for rotation with the propeller blade.

As seen in Fig. 4, the exterior periphery of the hub socket 11 is formed with an integral retaining ring or shoulder 41a. The ring 41a supports semi-circular bulkhead sections 42 and 43, the bulkhead sections 42 and 43 being retained in position by means of a strap 44 which is disposed in a groove in the complementary bulkhead sections 42 and 43. The bulkhead 42 is formed with a semi-circular track portion 46 of simple curvature, and the bulkhead 43 is formed with a semi-circular track portion 45 of simple curvature. The semi-circular track portions 45 and 46 form a circular track around the propeller blade 12. The spinner shell 13 is suitably connected with the bulkheads 42 and 43 by means of rivets 47. The rollers 39 of the hub subassembly are disposed within the circular track formed by grooved portions 45 and 46. Thus, the rollers 39 rotatably support the hub sections 28 and 29 for rotation with the propeller blade relative to the spinner shell 13.

Each hub section also has attached thereto by means of rivets 48 a plurality of hinge members 49 which complement the hinge members 35 of the segmental seal members. The hinge members 35 and 49 are interconnected by a pin 50, as shown in Figs. 4 and 5. Thus, the segmental members 16 through 27 are supported for pivotal movement relative to the hub sections 28 and 29. It should further be noted that segmental members 21, 22 and 16, 27 have their side edges contoured to form an airfoil opening in the seal assembly through which the blade 12 extends, as seen in Fig. 3.

With particular reference to Figs. 3 and 5, the manner in which each segmental member is pivotally connected to its adjacent segmental members will be described. From an inspection of Fig. 5, it is apparent that side 34 of each segmental member is formed with an integral, circumferentially extending lug 51, while the side 33 is formed with a pair of spaced circumferentially extending lugs 52 and 53. Each of the lugs is formed with an opening therein designated by numerals 54, 55 and 56. In the assembly, the lug 51 of one segment is superimposed over the lug 52 of its adjacent segment with the holes 54 and 55 therein disposed in alignment so that a pin 57 may be inserted therethrough. The pins 57 pivotally interconnect each segmental member to its adjacent segmental members. The lug 53 is arranged to support a roller 58 carried by a pin 59 received in the opening 56 and suitably retained therein. Thus, each segmental member carries a roller 58.

As seen in Fig. 4, the spinner shell 13 has attached thereto an inverted L-shaped member 62, which circumscribes the cutout opening 14. The track 60 is of compound curvature. That is, the track 62 follows the outline of the spinner profile as well as the outline of the cutout opening 14. The rollers 58 are urged into contact with the track 62 due to the thrust of centrifugal force during rotation of the propeller assembly, as depicted in Fig. 4. When the propeller is stationary, the segments will engage the upper edge of member 62. Thus, the rollers 58 rotatably support the segmental sections of the seal assembly for rotation relative to the spinner shell 13.

During rotation of the propeller blade 12 about its longitudinal axis throughout a 90° angle, as indicated by the solid and phantom lines in Fig. 4, the seal assembly 15 will rotate with the blade 12 and maintain a substantially smooth spinner profile at all pitch positions of the blade. Thus, during rotation of the blade 12 and the seal assembly 15, the segmental members 16 through 27 will move about their hinge connection with the hub sections 28 and 29 and also pivot relative to each other about the pins 57. Inasmuch as each segmental member is of sandwich construction, and, hence, necessarily rigid, the seal assembly will not be distorted due to centrifugal loading caused by high speed flight.

While the embodiment of the present invention as herein disclosed, constitutes a preferred form, it is to be understood that other forms might be adopted.

What is claimed is as follows:

1. In an aircraft propeller having a hub and a plurality of blades journaled in said hub for pitch adjustment, said propeller hub being enclosed by a spinner having openings through which said blades extend, said spinner having a first track circumscribing the periphery of each opening and a second track disposed inwardly of said first track, a rotatable seal assembly for each spinner opening through which a blade extends comprising, a pair of semi-circular hub sections disposed on opposite sides of the blade extending through its respective opening, means drivingly interconnecting said hub sections and said blade, each hub section having a plurality of inwardly extending webs which terminate in a semi-circular portion, means interconnecting the semi-circular ring portions of the two hub sections, roller means carried by said ring sections and guided for movement in said second track, a plurality of segmental members pivotally connected to said hub sections, means pivotally interconnecting each segmental member to its adjacent segmental members, and roller means carried by each segmental member and guided for movement in said first track.

2. In an aircraft propeller having a hub and a plurality of blades journaled in said hub for pitch adjustment, said propeller hub being enclosed by a spinner having openings through which said blades extend, a rotatable seal assembly for each spinner opening through which a blade extends comprising, a pair of hub sections disposed on opposite sides of said blade and drivingly connected therewith, a plurality of segmental members on each side of said blade having their inner ends pivotally connected to one of said hub sections, first track forming means in the spinner disposed in a circular arrangement around each blade, second track forming means in the spinner disposed in a circular arrangement around each blade, means carried by said hub sections and received in said first track forming means for rotatably supporting said hub sections, means pivotally interconnecting each segmental member to its adjacent segmental members, and means carried by each segmental member and received in said second track forming means for rotatably supporting said segmental members.

3. In an aircraft propeller having a hub and a plurality of blades journaled in said hub for pitch adjustment, said propeller hub being enclosed by a spinner having openings through which said blades extend, a rotatable seal assembly for each spinner opening through which a blade extends comprising, a hub section disposed on each side of said blade, a plurality of segmental members pivotally connected to each hub section, each hub section having a plurality of inwardly extending, circumferentially spaced webs that terminate in a ring portion, a pair of U-shaped brackets connected to diametrically opposed, juxtaposed end webs of said hub sections for interconnecting said hub sections, means supporting said interconnected hub sections for rotation with said blade relative to said spinner, means interconnecting each segmental member with its adjacent segmental member, and means supporting said segmental members for rotation relative to said spinner.

4. In combination with a propeller and spinner therefor, said propeller having a plurality of blades capable of rotation about their longitudinal axes and extending through openings in said spinner, a pair of spaced coaxial tracks located in the spinner around each blade, one of said tracks having a simple curvature, the other track having a compound curvature, a seal assembly drivingly connected with said blades and movable therewith for closing the openings in said spinner, said seal assembly comprising a plurality of undistortable members of compound curvature, means pivotally interconnecting said members for movement relative to each other, and a pair of radially spaced roller means carried by said members and guided for movement in said pair of tracks for rotatably supporting said seal assembly in said spinner during rotation of said blades.

5. In combination with a propeller and a spinner therefore, said propeller having a plurality of blades capable of rotation about their longitudinal axes and extending through openings in said spinner, a pair of coaxial substantially circular tracks of different diameter in the spinner around each blade, a seal assembly drivingly connected with said blades and movable therewith for closing the openings in said spinner, said seal assembly comprising a plurality of rigid members each pivotable relative to said blade about an axis extending radially outwardly of said blade, means pivotally interconnecting said members for movement relative to each other, and roller means carried by said members and guided for movement in said tracks for rotatably supporting said seal assembly in said spinner during rotation of said blades.

6. In an aircraft propeller having a hub and a plurality of blades journalled in said hub for pitch adjustment, said propeller hub being enclosed by a spinner having openings through which said blades extend, a rotatable seal assembly for each spinner opening through which a blade extends comprising, a hub section disposed on each side of said blade, a plurality of rigid segmental members pivotally connected to each hub section for movement of each segmental member about an axis extending radially outwardly of said blade, means interconnecting said hub sections, said spinner having a circular track around each blade, a plurality of rollers carried by said interconnected hub sections and received in said circular track for rotatably supporting said hub sections, means interconnecting said segmental member with its adjacent segmental member, and means supporting said segmental members for rotation relative to said spinner.

7. In an aircraft propeller having a hub and a plurality of blades journalled in said hub for pitch adjustment, said propeller hub being enclosed by a spinner having openings through which said blades extend, a rotatable seal assembly for each spinner opening through which a blade extends comprising, a hub section disposed on each side of said blade, a plurality of segmental members pivotally connected to each hub section for movement of each segmental member about an axis extending radially of said blade, sandwiched structural plates constituting said members for complete rigidity thereof, first means supporting said interconnected hub sections for rotation with said blade relative to said spinner, each segmental member having a circumferentially extending lug at its outer end, said segmental members being assembled so that said lug overlaps the adjacent segmental member, a pin extending through each lug and into the adjacent segmental member for pivotally interconnecting each segmental member to its adjacent segmental members, and second means supporting said segmental members for rotation relative to said spinner.

8. In an aircraft propeller having a hub and a plurality of blades journalled in said hub for pitch adjustment, said propeller hub being enclosed by a spinner having openings through which a blade extends comprising, a hub section disposed on each side of said blade, a plurality of rigid segmental members pivotally connected to each hub section for movement of each segmental member about an axis extending radially outwardly of said blade, means interconnecting said hub sections, first means supporting said interconnected hub sections with said pivotally connected members for rotation with said blade relative to said spinner, means pivotally interconnecting each segmental member with its adjacent segmental members, second means supporting said pivotally connected members disposed around the periphery of each opening, and a roller carried by each segmental member and engageable with said second means due to centrifugal force caused by propeller rotation for rotatably supporting said segmental members.

9. In the aircraft propeller of claim 8 having said hub sections and said rigid segmental members pivotally connected to each hub section for movement of each segmental member about an axis extending radially outwardly of said blade, a rivet-like pivot pin provided between said hub section and said segmental member, each said pin extending radially outwardly of said blade and forming the axis about which each said segmental member is pivotally movable relative to said blade hub section.

References Cited in the file of this patent

UNITED STATES PATENTS

| | | |
|---|---|---|
| 2,522,083 | Avondolglio | Sept. 12, 1950 |
| 2,612,227 | Cushman | Sept. 30, 1952 |
| 2,742,096 | Brady | Apr. 17, 1956 |

FOREIGN PATENTS

| | | |
|---|---|---|
| 1,005,353 | France | Apr. 9, 1952 |